US009736665B2

(12) United States Patent
Chang et al.

(10) Patent No.: US 9,736,665 B2
(45) Date of Patent: Aug. 15, 2017

(54) ORIGINAL CALLING IDENTIFICATION WITH MOBILE PHONE IN DOCKED MODE

(75) Inventors: Sujin Catherine Chang, Stow, MA (US); Elliot G. Eichen, Arlington, MA (US); Lee N. Goodman, Tyngsboro, MA (US); Punita Mishra, Potomac, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 729 days.

(21) Appl. No.: 13/040,336

(22) Filed: Mar. 4, 2011

(65) Prior Publication Data

US 2012/0155332 A1   Jun. 21, 2012

Related U.S. Application Data

(63) Continuation-in-part of application No. 12/971,409, filed on Dec. 17, 2010, now Pat. No. 9,143,359.

(51) Int. Cl.
| | |
|---|---|
| *H04L 12/16* | (2006.01) |
| *H04W 4/16* | (2009.01) |
| *H04M 1/253* | (2006.01) |
| *H04M 3/54* | (2006.01) |
| *H04L 29/06* | (2006.01) |
| *H04M 1/04* | (2006.01) |
| *H04M 7/00* | (2006.01) |

(52) U.S. Cl.
CPC .......... *H04W 4/16* (2013.01); *H04L 65/1006* (2013.01); *H04L 65/1069* (2013.01); *H04L 65/1096* (2013.01); *H04M 1/2535* (2013.01); *H04M 3/54* (2013.01); *H04M 1/04* (2013.01); *H04M 7/006* (2013.01); *H04M 2203/1091* (2013.01); *H04M 2207/182* (2013.01); *H04M 2207/20* (2013.01)

(58) Field of Classification Search
CPC .......... H04M 2203/1091; H04M 1/04; H04M 1/2535; H04M 2207/182; H04M 2207/20; H04M 3/54; H04M 7/006; H04W 4/16
USPC ....... 370/250–260; 455/414–417, 435.1, 560
See application file for complete search history.

(56) References Cited

U.S. PATENT DOCUMENTS

| | | |
|---|---|---|
| 6,148,074 A | 11/2000 | Miloslavsky et al. |
| 6,327,470 B1 | 12/2001 | Ostling |
| 7,107,360 B1 | 9/2006 | Phadnis et al. |
| 7,110,789 B1 | 9/2006 | Curtiss et al. |
| 7,120,241 B1 | 10/2006 | Fuoss et al. |
| 7,143,198 B2 | 11/2006 | Lee et al. |
| 7,379,436 B2 * | 5/2008 | Jiang ................ H04L 29/06027 370/328 |
| 7,400,886 B2 | 7/2008 | Sahim et al. |
| 7,460,525 B2 * | 12/2008 | Moore, Jr. .......... H04M 1/2535 370/338 |

(Continued)

*Primary Examiner* — Khaled Kassim
*Assistant Examiner* — Berhanu Belete

(57) ABSTRACT

A mobile device determines whether the mobile device is docked with a docking station that connects to a VoIP network, where the mobile device is capable of receiving calls to a cellular telephone number and calls to a VoIP telephone number. The mobile device notifies, if the mobile device is docked with the docking station, a call handling node in a cellular network to forward calls destined for the cellular telephone number to the VoIP telephone number at a VoIP call server. The mobile device receives a call forwarded from the VoIP call server, where the call was originally destined for the cellular telephone number.

18 Claims, 13 Drawing Sheets

(56) References Cited

U.S. PATENT DOCUMENTS

| | | |
|---|---|---|
| 7,657,537 B1 | 2/2010 | Corbett |
| 7,707,310 B2 | 4/2010 | Thubert et al. |
| 2002/0118664 A1 | 8/2002 | Ishibashi et al. |
| 2003/0039242 A1* | 2/2003 | Moore, Jr. ............. 370/354 |
| 2003/0120821 A1 | 6/2003 | Thermond et al. |
| 2004/0072558 A1* | 4/2004 | Van Bosch ........... H04M 1/006 455/417 |
| 2004/0122651 A1 | 6/2004 | Herle |
| 2004/0128554 A1 | 7/2004 | Maher et al. |
| 2005/0013103 A1 | 1/2005 | Chandley |
| 2005/0025129 A1 | 2/2005 | Meier |
| 2005/0060644 A1* | 3/2005 | Patterson ............ G06K 9/2054 715/221 |
| 2005/0090271 A1 | 4/2005 | Sylvain |
| 2005/0186960 A1* | 8/2005 | Jiang ....................... 455/435.1 |
| 2005/0227666 A1 | 10/2005 | Cheng |
| 2006/0084471 A1* | 4/2006 | Walter ................. H04M 1/723 455/557 |
| 2006/0120329 A1 | 6/2006 | Kim et al. |
| 2006/0187900 A1 | 8/2006 | Akbar |
| 2006/0229074 A1* | 10/2006 | Semper ................ H04W 36/14 455/436 |
| 2006/0229101 A1* | 10/2006 | LaBauve et al. ............ 455/560 |
| 2006/0242305 A1 | 10/2006 | Alnas |
| 2007/0189264 A1* | 8/2007 | Liu .............................. 370/351 |
| 2007/0207782 A1* | 9/2007 | Tran ................ H04L 29/06027 455/414.1 |
| 2007/0280154 A1 | 12/2007 | Gupta et al. |
| 2007/0287438 A1* | 12/2007 | Hansen .................. H04M 3/54 455/417 |
| 2008/0056472 A1 | 3/2008 | Tanemura et al. |
| 2008/0139222 A1 | 6/2008 | Falvo et al. |
| 2008/0151875 A1 | 6/2008 | Lim |
| 2008/0278894 A1 | 11/2008 | Chen et al. |
| 2009/0001173 A1 | 1/2009 | Sevier et al. |
| 2009/0022301 A1 | 1/2009 | Mudaliar |
| 2009/0023442 A1 | 1/2009 | Ahmed et al. |
| 2009/0028130 A1* | 1/2009 | Volkaerts ............ H04L 12/5692 370/352 |
| 2009/0059907 A1* | 3/2009 | Sindhwani et al. .......... 370/354 |
| 2009/0073960 A1* | 3/2009 | Kalaboukis ........ H04M 7/1245 370/352 |
| 2009/0097492 A1 | 4/2009 | Monette et al. |
| 2009/0097629 A1* | 4/2009 | Huslak et al. ........... 379/207.01 |
| 2009/0163139 A1 | 6/2009 | Wright-Riley |
| 2009/0305683 A1* | 12/2009 | Gupta et al. ................. 455/417 |
| 2010/0074247 A1 | 3/2010 | Clark et al. |
| 2010/0120450 A1* | 5/2010 | Herz ................ H04M 3/42348 455/456.3 |
| 2010/0130169 A1* | 5/2010 | Narayanaswamy et al. . 455/411 |
| 2010/0131691 A1* | 5/2010 | Chatterjee ............ G06F 1/1632 710/303 |
| 2010/0157990 A1 | 6/2010 | Krzyzanowski et al. |
| 2010/0159934 A1 | 6/2010 | Forssell |
| 2010/0220616 A1 | 9/2010 | Glyakov et al. |
| 2010/0250818 A1 | 9/2010 | Gill et al. |
| 2010/0306061 A1* | 12/2010 | Wagner ................ G06Q 30/02 705/14.66 |
| 2011/0040858 A1 | 2/2011 | Gum |
| 2011/0053643 A1* | 3/2011 | Shmunis .................... 455/556.1 |
| 2011/0098087 A1* | 4/2011 | Tseng ......................... 455/557 |
| 2011/0206052 A1 | 8/2011 | Tan et al. |
| 2011/0287820 A1* | 11/2011 | Harrison et al. ........... 455/575.7 |
| 2012/0057565 A1 | 3/2012 | Mani |
| 2012/0099566 A1 | 4/2012 | Laine et al. |
| 2012/0303476 A1 | 11/2012 | Krzyzanowski et al. |

* cited by examiner

ORIGINAL CALLING IDENTIFICATION WITH MOBILE PHONE IN DOCKED MODE

RELATED APPLICATION

The present application is a continuation-in-part (CIP) of U.S. application Ser. No. 12/971,409, entitled "Mobile Phone Docking Station for VoIP" and filed Dec. 17, 2010, the disclosure of which is incorporated by reference herein in its entirety.

BACKGROUND

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTN) which typically incur much higher costs to carry phone calls from sources to destinations. By using VoIP (e.g., IP packets carrying audio data) for carrying a call for most of the distance of the call, instead of using a PSTN, the cost of the call can be reduced relative to having a PSTN carry the entirety of the call. Usually, VoIP involves a call being carried via the Internet to a point in the PSTN very close to the call destination. At that point, the call is switched to the PSTN for completion of the connection with the call destination. By minimizing the distance that the call is carried on the PSTN, the cost of the call may be substantially reduced relative to solely using the PSTN for the entirety of the call.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, a mobile device that is capable of receiving calls via a cellular network or via a VoIP network selectively causes calls destined for the mobile device's cellular network telephone number to be forwarded to a VoIP telephone number associated with the mobile device. The selective forwarding of calls originating in the cellular network to a mobile device's VoIP telephone number avoids the dropping of VoIP calls at the mobile device if cellular network originated calls happen to be received during the occurrence of the VoIP calls. Embodiments described herein also enable information to be included in SIP signaling information associated with the forwarded call that identifies the forwarded call as having originated in the cellular network. The information included in the SIP signaling information may include an identification of the telephone number to which the original call was directed. The information included in the SIP signaling information permits the mobile device to present calls, forwarded from the cellular network telephone number to the VoIP telephone number, differently than other VoIP calls that were originally destined for the VoIP telephone number. Therefore, a normal VoIP call received at the mobile device may be presented differently to the user of the mobile device than a call originally destined for the mobile device's cellular network telephone number which was forwarded to the VoIP telephone number of the mobile device.

Figure 1A:
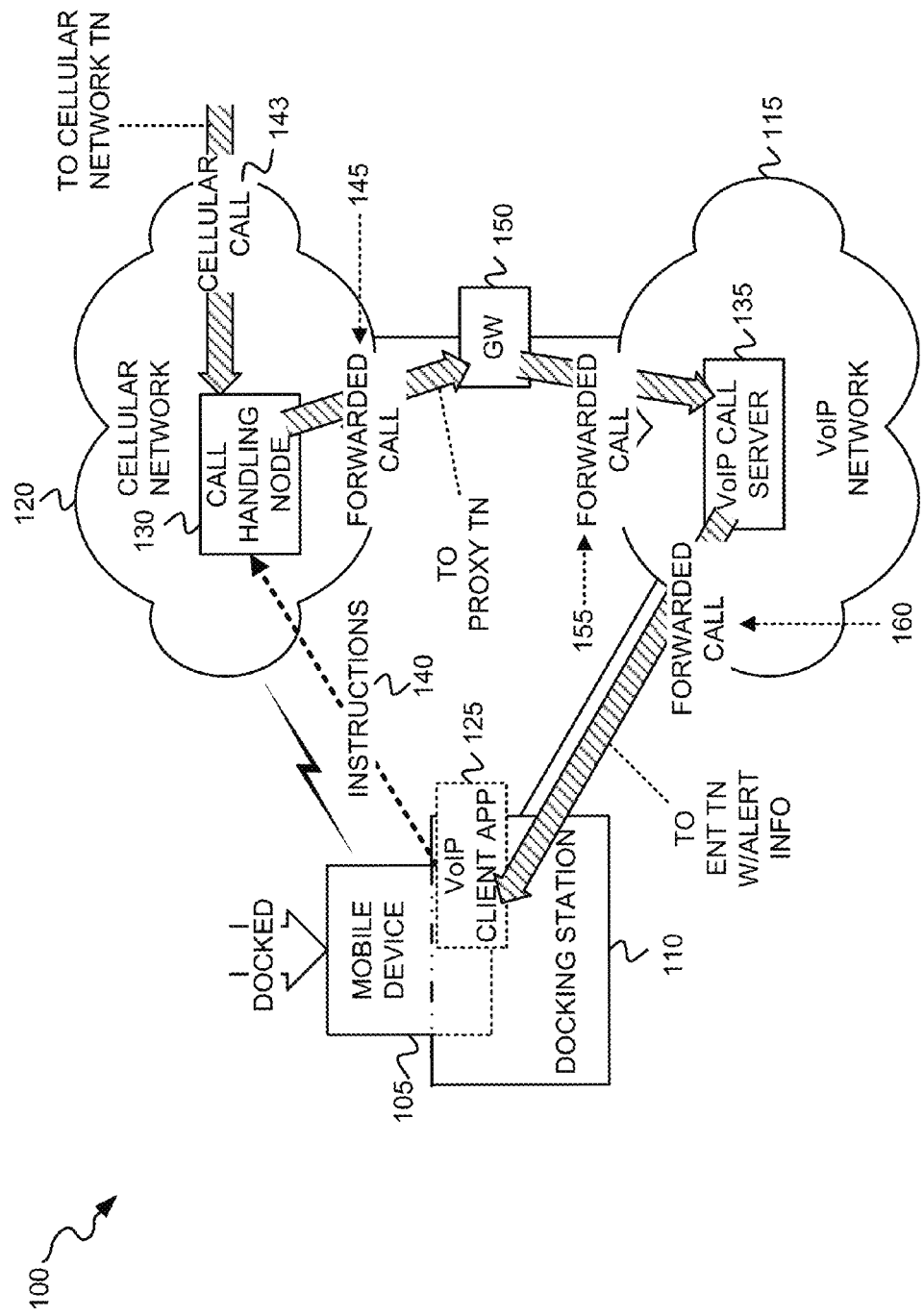
FIGS. 1A and 1B are diagrams that depict an exemplary network environment in which calls directed to a cellular network telephone number associated with a mobile device are selectively forwarded to the mobile device as a VoIP call via a VoIP network.
Figure 1B:
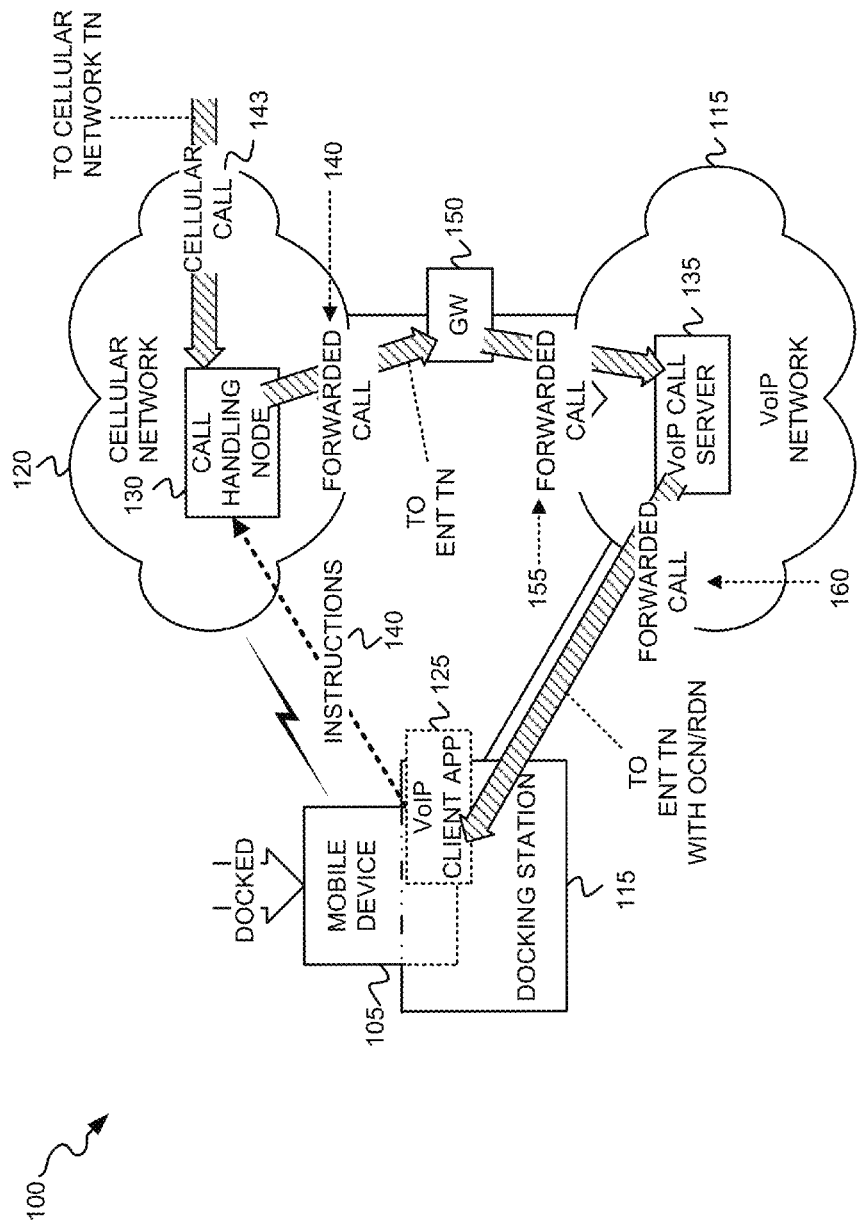

FIGS. 1A and 1B are diagrams that depict an exemplary network environment 100 in which calls directed to a cellular network telephone number (TN) associated with a mobile device 105 are selectively forwarded to mobile device 105 as a VoIP call via a VoIP network 115 based on whether mobile device 105 is docked in a docking station 110. Mobile device 105 may be capable of receiving/sending calls via a cellular network 120 when mobile device 105 is undocked from docking station 110, and may have an associated cellular network TN for receiving/sending calls via cellular network 120. Mobile device 105 may further be capable of receiving/sending calls via VoIP network 115 when mobile device 105 is docked in docking station 110, and may have an associated VoIP network TN for receiving/sending calls via VoIP network 115.

Docking station 110 may include a Voice over Internet Protocol (VOIP) phone that has a connection to VoIP network 115 and which also has a docking port that permits mobile device 105 to be "docked" with docking station 110. Mobile device 105 may include, for example, a cellular telephone (e.g., a smart phone), a tablet computer, a personal digital assistant (PDA), or other type of digital computing device that has the capability to communicate via at least a cellular network connection (and possibly other types of network connections). In some instances, while docked in docking station 110, a wired connection via VoIP network 115 may be available to mobile device 105 via docking station 110. A VoIP client application 125 at mobile device 105 may determine that VoIP calls may be received via VoIP network 115 and may instruct a call handling node 130 in cellular network 120 to forward calls directed to mobile device 105's cellular network TN to VoIP network 115 for further forwarding to VoIP client application 125 of mobile device 105 as a VoIP call via a VoIP call server 135. The VoIP call forwarded from VoIP call server 135 may include additional information that identifies the call as originating in cellular network 120 (i.e., originally destined for a cellular network TN associated with mobile device 105). In one exemplary implementation, the additional information may be included as alert information in a Session Initiation Protocol (SIP) header of SIP signaling associated with the VoIP call. In another exemplary implementation, the additional information may be included as a flag and an Originally Called Number (OCN) or Redirect Number (RDN) in a SIP header of SIP signaling associated with the VoIP call.

FIG. 1A depicts details of the exemplary implementation in which the additional information that identifies a call as originating in cellular network 120 may be included as alert information in a SIP header of SIP signaling associated with the VoIP call. As shown in FIG. 1A, mobile device 105 may be docked in docking station 110. When docked (or based on user input to mobile device 105), VoIP client application 125 may send instructions 140 to call handling node 130 to instruct call handling node 130 to forward calls destined for mobile device 105's cellular TN to a proxy TN at VoIP call server 135. The proxy TN may include a TN in VoIP network 115 that uniquely identifies any calls forwarded to that proxy TN as having originated in cellular network 120 and having been originally destined for the cellular network TN associated with mobile device 105.

When call handling node 130 receives a cellular call 143 destined for the cellular network TN associated with mobile device 105, call handling node 130 may forward the call 145 to a proxy telephone number in VoIP network 115. Forwarded call 145 may be received at a gateway node 150, re-formatted as a VoIP call, and then forwarded as a call 155 to VoIP call server 135. At VoIP call server 135, the proxy TN may also be associated (e.g., in a table look-up) with an enterprise VoIP TN associated with mobile device 105. VoIP call server 135 may retrieve the VoIP TN for mobile device 105 based on the proxy TN. Subsequent to retrieving the VoIP TN for mobile device 105, VoIP call server 135 may forward the call 160, as a VoIP call, to VoIP client application 125 at mobile device 105.

In addition to the forwarded call, VoIP call server 135 may send data associated with the call that identifies the call as having originated in a cellular network (i.e., was originally destined for mobile device 105's cellular network TN). In one exemplary implementation, the data may include alert information, included in a Session Initiation Protocol (SIP) header of SIP signaling associated with the call, which identifies the call as having originated in a cellular network. Upon receipt of forwarded call 160 at mobile device 105, VoIP client application 125 may present call 160 differently to a user of mobile device 105 than VoIP calls received at mobile device 105 that were originally destined for the VoIP telephone number. In one exemplary implementation, presenting call 160 differently to the user may include using distinctive ringing for the call forwarded from the VoIP call server that is different than ringing used for the VoIP calls received at the mobile device that were originally destined for the VoIP telephone number. In another exemplary implementation, presenting call 160 differently to the user may include displaying, at the mobile device, an indication that the forwarded call was originally destined for the cellular telephone number.

FIG. 1B depicts details of the exemplary implementation in which the additional information that identifies a call as originating in cellular network 120 may be included as a flag and an Originally Called Number (OCN) or Redirect Number (RDN) in a SIP header of SIP signaling associated with the VoIP call. As shown in FIG. 1B, mobile device 105 may be docked in docking station 110. When docked (or based on user input to mobile device 105), VoIP client application 125 may send instructions 140 to call handling node 130 to instruct call handling node 130 to forward calls destined for mobile device 105's cellular TN to an enterprise TN at VoIP call server 135. The enterprise TN may be mobile device 105's VoIP TN in VoIP network 115.

When call handling node 130 receives a cellular call 143 destined for the cellular network TN associated with mobile device 105, then call handling node 130 may forward the call as a forwarded call 145 to the enterprise TN in VoIP network 115 associated with mobile device 105. Forwarded call 145 may be received at a gateway node 150, re-formatted as a VoIP call, and then forwarded as a call 155 to VoIP call server 135. When forwarded call 155 is received at VoIP call server 135, VoIP call server 135 may set a flag indicating that the call originated in cellular network 120, and may obtain the SIP OCN and/or RDN for the call that identifies the cellular network TN of mobile device 105 to which the call was originally destined. VoIP call server 135 may forward the call 160, as a VoIP call, to VoIP client application 125 at mobile device 105.

In addition to the forwarded call, VoIP call server 135 may send data associated with the call that identifies the call as having originated in a cellular network (i.e., was originally destined for mobile device 105's cellular network TN). In one exemplary implementation, the data may include the flag and the OCN and/or RDN included in a Session Initiation Protocol (SIP) header of SIP signaling associated with the call. Upon receipt of forwarded call 160 at mobile device 105, VoIP client application 125 may present call 160 differently to a user of mobile device 105 than VoIP calls received at mobile device 105 that were originally destined for the VoIP telephone number. In one exemplary implementation, presenting call 160 differently to the user may include using distinctive ringing for the call forwarded from the VoIP call server that is different than ringing used for the VoIP calls received at the mobile device that were originally destined for the VoIP telephone number. In another exemplary implementation, presenting call 160 differently to the user may include displaying, at the mobile device, an indication that the forwarded call was originally destined for the cellular telephone number.

Figure 2A:
FIGS. 2A and 2B are diagrams that depict an exemplary docking station in which a mobile device may be docked.
Figure 2B:

FIGS. 2A and 2B depict an example of a physical configuration of docking station 110, mobile device 105, and a mobile device tray 200, and the physical interconnection of docking station 110, mobile device 105, and mobile device tray 200. Mobile device tray 200 may include a physical configuration that fits the external configuration of mobile device 105, such that mobile device 105 may be inserted into mobile device tray 200. In addition, mobile device 105's Universal Serial Bus (USB) port (or other connector ports) may interconnect with an appropriate physical and electrical port on mobile device tray 200. Subsequent to insertion of mobile device 105 into mobile device tray 200, tray 200 may be inserted into a docking port 210 of docking station 110 to complete the USB port interconnection between mobile device 105 and docking station 110. FIG. 2B depicts mobile phone 105 inserted into docking port 210 of docking station 110. While docked in docking station 110, mobile device 105 may be used for controlling the operation of docking station 110. For example, if mobile device 105 has a touch panel display, then the touch panel display may be used for dialing a VoIP call, instead of using a keypad on docking station 110.

Figure 3:
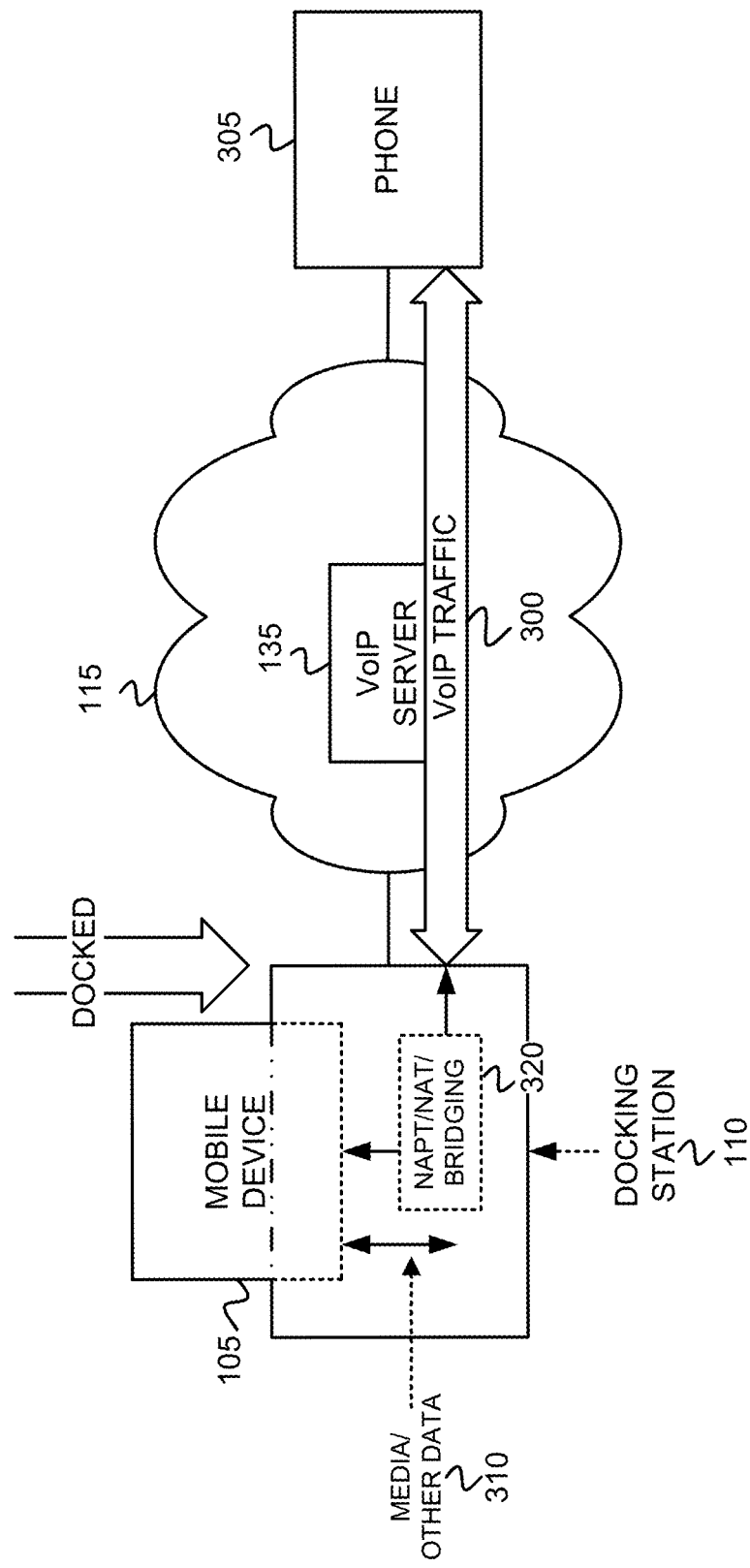
FIG. 3 is a diagram that depicts the exemplary docking station of FIG. 1 enabling a VoIP connection between a docked mobile device and an external network.

FIG. 3 depicts a circumstance in which mobile device 105 is docked with docking station 110, and mobile device sends/receives VoIP calls (and associated signaling) to/from, for example, a phone 305 using VoIP traffic 300 via a wired connection to VoIP network 115. As shown in FIG. 3, mobile device 105 may be docked (i.e., physically inserted into a docking port) with docking station 110. Upon being docked with docking station 110, mobile device 105 may exchange media (e.g., audio or video) or other data 310 with docking station 110. The exchanged media 310 may include audio streamed from a microphone of docking station 110 to mobile device 105, or from a microphone of mobile device 105 to docking station 110. The exchanged media may further include video streamed from a camera (or memory) of docking station 110 to mobile device 105, or from a camera (or memory) of mobile phone 105 to docking station 110.

As further shown in FIG. 3, docking station 110 may connect to VoIP network 115 for sending and/or receiving VoIP traffic 300 to/from mobile device 105 via VoIP call server 135. Docking station 110 may forward VoIP traffic 300 from VoIP network 115 to mobile device 105, and from mobile device 105 to network 115 via a system 320 that implements Network Address Port Translation (NAPT), Network Address Translation (NAT), or a bridging mode. When implementing NAPT or NAT, system 320 may route packets associated with VoIP traffic 300 to/from mobile device 105. A side of docking station 110 facing network 115 may have a public, routable Internet Protocol (IP) address on network 115, while a side of docking station 110 facing mobile device 105 may have a statically configured private IP address. The routable IP address of docking station 110 facing network 115 may be statically configured, or may be obtained via the Dynamic Host Configuration Protocol (DHCP) from network 115. Mobile device 105 may have a statically configured private IP address (e.g., on a same network as the private IP address of docking station 100). Mobile device 105 may use the routable IP address of docking station 110 as a default gateway for sending VoIP packets to phone 305 via network 115 and VoIP server 135. A physical and layer 2 connection between docking station 110 and mobile device 105 may include Ethernet over Universal Serial Bus (USB) (e.g., Ethernet frames encapsulated in USB packets). Media 310 may be streamed from the private IP address associated with mobile device 105 to the private IP address associated with docking station 110, or may be streamed in the reverse direction.

When implementing the bridging mode, system 320 may forward packets, at layer 2, network 115, though docking station 110, to mobile device 105. Additionally, system 320 may forward packets, at layer 2, from mobile device 105, though docking station 110, to network 115. Docking station 100 may have an IP address, routable in network 115, and mobile device 105 may also have a different IP address that is routable in network 115. System 320, implementing the bridging mode, may forward packets received at docking station 110 from network 115 to the routable IP address of mobile device 105. Additionally, when implementing the bridging mode, system 320 may forward packets, received from mobile device 105 at the routable IP address of docking station 110, to network 115.

Figure 4:
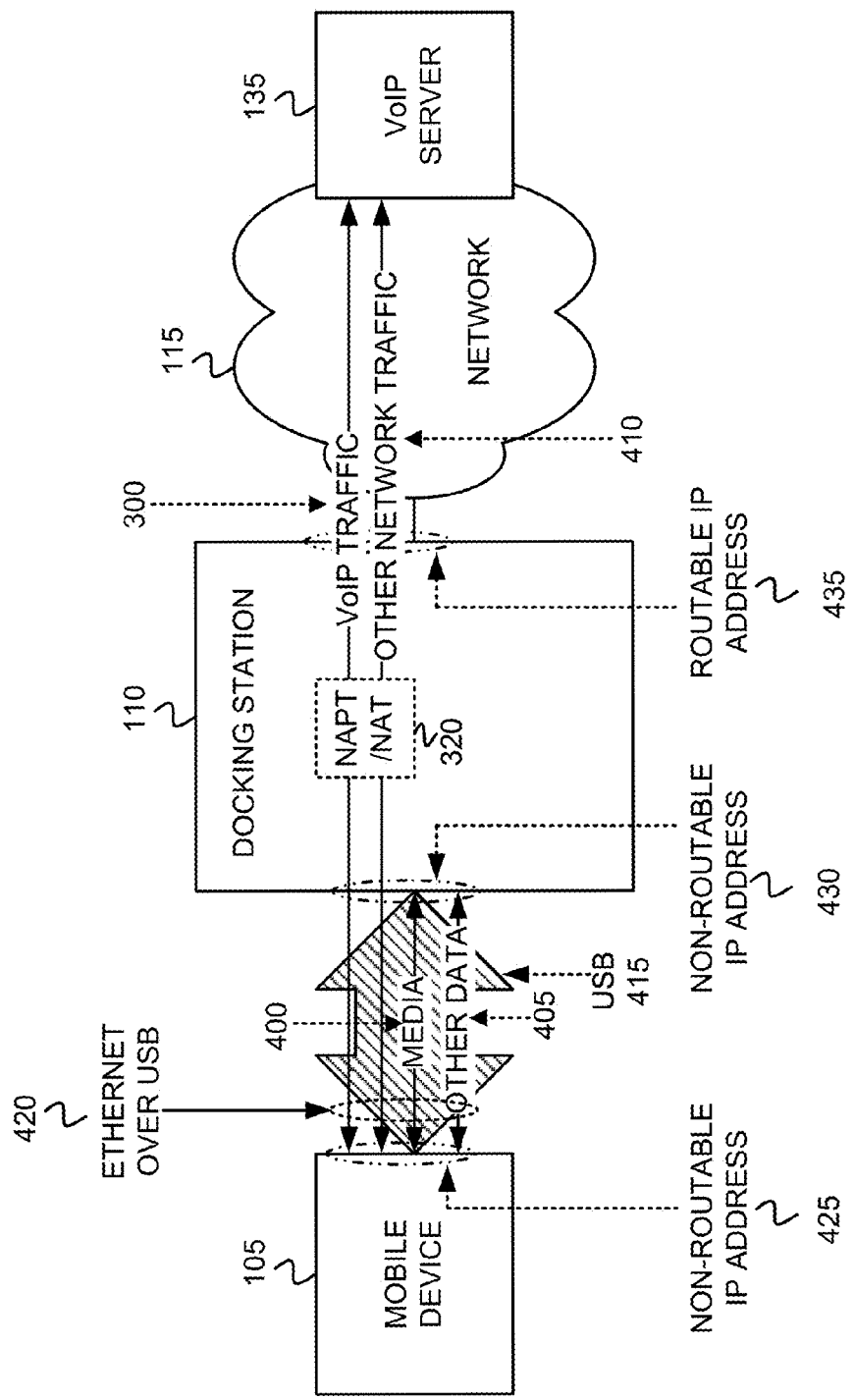
FIG. 4 is a diagram that depicts an exemplary implementation of the docking station of FIG. 1 in which the docking station implements Network Address and Port Translation or Network Address Translation for establishing a VoIP connection between a mobile device and an external network.

FIG. 4 is a diagram that depicts an exemplary implementation of docking station 110 of FIGS. 1A and 1B in which docking station 110 implements NAPT or NAT for establishing a VoIP connection between mobile device 105 and network 115. When mobile device 105 is docked into docking station 110, as shown in FIG. 1, media 400, other data 405, VoIP traffic 300 and other network traffic 410 may be sent to and from mobile device 105 via a Universal Serial Bus (USB) 415, as further shown in FIG. 4. Mobile device 105, therefore, acts as a USB peripheral, and docking station 110 acts as a USB host. Ethernet over USB protocol 420 may be used as the physical and layer 2 connection between docking station 110 and mobile device 105.

As shown in FIG. 4, mobile device 105 may have a statically configured IP address 425 that is non-routable from network 115 (but routable between IP address 430 of docking station 110 and IP address 425 of mobile device 105). As further shown in FIG. 4, docking station 110 may also have a statically configured IP address 430 that is non-routable from network 115 (but routable between IP address 430 of docking station 110 and IP address 425 of mobile device 105), where IP address 430 resides on a same private network (not shown) on which IP address 425 of mobile device 105 resides. A private network (not shown in FIG. 4), therefore, exists between mobile device 105 and docking station 110 via USB 415.

As further shown in FIG. 4, docking station 110 may have an IP address 435 that is routable from network 115. Routable IP address 435 may be statically configured, or may be obtained via the DHCP protocol from network 115. Docking station 110 may, therefore, act as a DHCP server to mobile device 105, thereby obtaining routable IP address 435 that may be used by network 115 to forward VoIP traffic 300 and other network traffic 410 to mobile device 105 via NAPT/NAT system 320. Non-routable, private IP address 425 on mobile device 105 and non-routable, private IP address 430 on docking station 110 may be statically configured prior to the connection of mobile device 105 to docking station 110 via USB 415. By having a routable IP address 435 on network 115, a network administrator may manage docking station 110 including, for example, providing software upgrades, firewall management, etc. The ability to address docking station 110 from network 115 may not be available when docking station 110 acts as an IP bridge (e.g., the exemplary bridging implementation of FIG. 5).

Media 400 may include audio or video data (e.g., streaming audio or video) that may be streamed from mobile device 105 for playback on docking station 110, or that may be streamed from docking station 110 for playback on mobile device 105. Media 400 may be streamed from mobile device 105 IP address 425 to docking station IP address 430, or from docking station IP address 430 to mobile device 105 IP address 425. Other data 405 may include keypad information (e.g., indications of keypad presses on docking station 110), status information (e.g., voicemail message indicator light, etc.), and other information that may be exchanged between mobile phone IP address 425 and docking station 110 IP address 430. Other data 405 may further include data other than audio or video data, such as, for example, web traffic data. The transfer of media 400 and/or other data 405 may be through sockets, such as Transmission Control Protocol (TCP) or User Datagram Protocol (UDP) sockets.

VoIP traffic 300 may include VoIP signaling traffic (e.g., Session Initiation Protocol (SIP) traffic) and VoIP media traffic (e.g., Real-time Transport Protocol (RTP) or RTP Control Protocol (RTCP)) and may be forwarded through docking station 110 via NAPT/NAT system 320. NAPT/NAT system 320 may implement a forwarding table that forwards packets to/from mobile device 105 through docking station 110 to routable network 115. For VoIP applications, the forwarding table may be configured to pass SIP and RTP or RTCP traffic to/from mobile device 105 to routable network 115. Additionally, other network traffic 410 may be forwarded to/from mobile device 105 through docking station 110 to routable network 115 by the forwarding table based on NAPT or NAT filtering. Other network traffic 410 may include Internet traffic (e.g., web browsing), etc. The forwarding table of NAPT/NAT system 320 may receive packets from IP address 425 of mobile device 105 sent to routable IP address 435 of docking station 110, and may forward the packets to an appropriate next hop IP address in network 115 (e.g., to a next hop switch). The forwarding table of NAPT/NAT system 320 may further receive packets from an IP address in network 115 sent to routable IP address 435, and may forward the packets to non-routable IP address 425 of mobile device 105. A network administrator of network 115 may designate what kinds of traffic are permissible, and the forwarding table at docking station 110 may be configured appropriately (e.g., e-mail and web browsing may be forwarded whereas other undesirable traffic may be blocked during the forwarding process). A forwarding table implemented at mobile device 105 may use routable IP address 435 of docking station 110 as the default gateway address for all outgoing packets.

Figure 5:
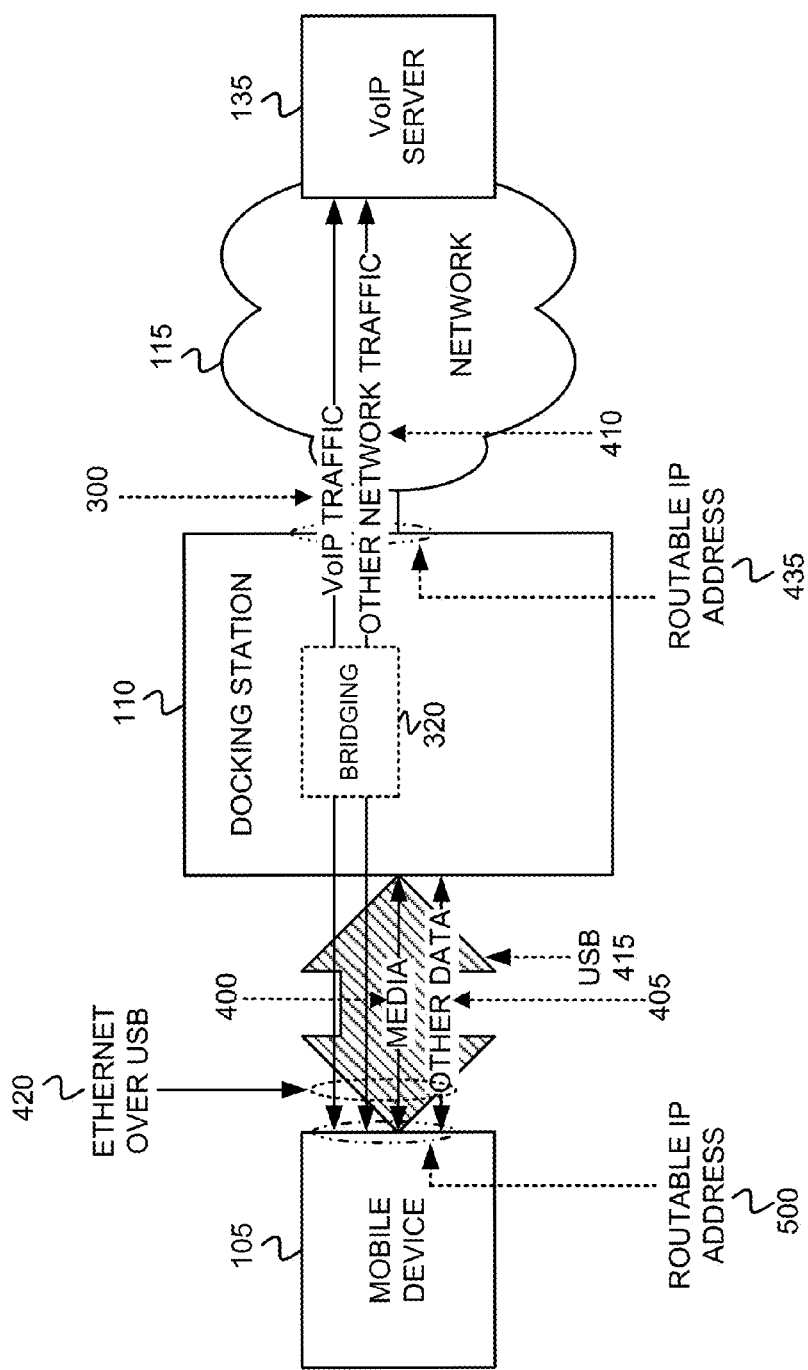
FIG. 5 is a diagram that depicts an exemplary implementation of the docking station of FIG. 1 in which the docking station implements a bridging mode for establishing a VoIP connection between the mobile device and an external network.

FIG. 5 is a diagram that depicts an exemplary implementation of docking station 110 of FIGS. 1A and 1B in which docking station 110 implements a bridging mode for establishing a VoIP connection between mobile device 105 and network 115. When mobile phone 105 is docked into docking station 110, as shown in FIGS. 1A and 1B, media 400, other data 405, VoIP traffic 300 and other network traffic 410 may be sent to and from mobile device 105 via a Universal Serial Bus (USB) 415, as further shown in FIG. 5. Mobile device 105, therefore, acts as a USB peripheral, and docking station 110 acts as a USB host. Ethernet over USB protocol 420 may be used as the physical and layer 2 connection between docking station 110 and mobile device 105.

As shown in FIG. 5, mobile device 105 may have an IP address 500 that is routable from network 115. As further shown in FIG. 5, docking station 110 may also have a IP address 435 that is routable from network 115. Routable IP addresses 500 and 435 may be statically configured, or may be obtained via the DHCP protocol from network 115. Docking station 110 may, therefore, act as a DHCP server to mobile phone 105, thereby obtaining routable IP addresses 500 and 435 that may be used by network 115 to forward VoIP traffic 300 and other network traffic 410 to mobile device 105 via bridging system 320.

Media 400 may be streamed from mobile device 105 for playback on docking station 110, or may be streamed from docking station 110 for playback on mobile device 105. Media 400 may be streamed from mobile device 105 IP address 500 to docking station IP address 435, or from docking station IP address 435 to mobile device 105 IP address 500. Other data 405 may include keypad information, status information, and other information that may be exchanged between mobile device IP address 500 and docking station 110 IP address 435.

VoIP traffic 300 may include VoIP signaling traffic (e.g., SIP traffic) and VoIP media traffic (e.g., RTP or RTCP) and may be forwarded through docking station 110 via bridging system 320. Bridging system 320 may forward, at layer 2, packets to/from mobile device 105 through docking station 110 to/from routable network 115. Bridging system 320 may "transparently" forward packets, without any NAPT or NAT filtering as performed in the implementation of FIG. 4, from mobile device 105 to network 115 and from network 115 to mobile device 105. For example, if network 115 includes an Ethernet Local Area Network (LAN), bridging system 320 may forward Ethernet frames from network 115 to mobile device 105 based on MAC addresses contained in the Ethernet frames.

Figure 6:
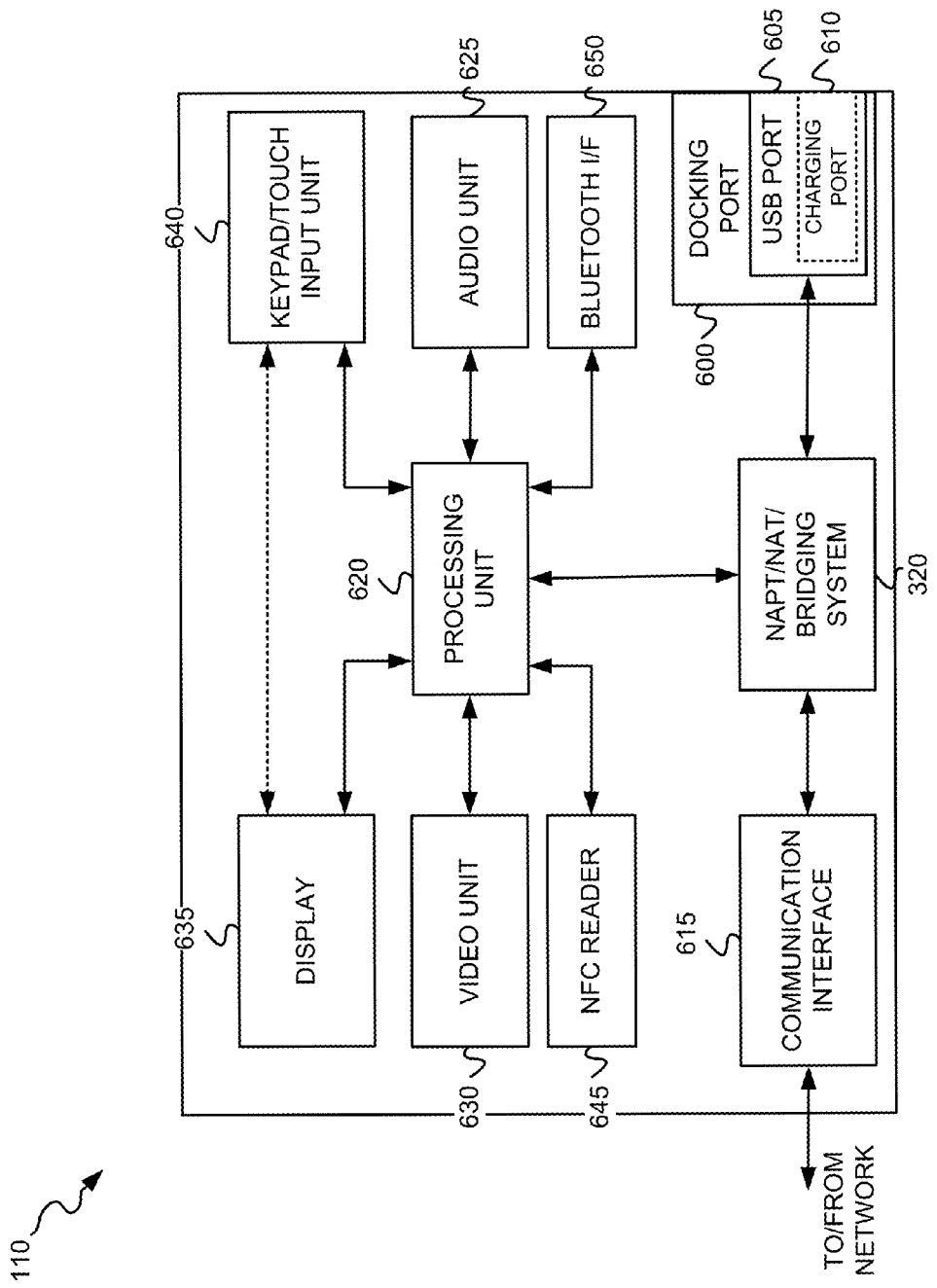
FIG. 6 is a diagram that depicts exemplary components of the docking station of FIG. 1.

FIG. 6 is a diagram that depicts exemplary components of docking station 110. Docking station 110 may include docking port 210, NAPT/NAT/Bridging system 320, a communication interface 615, a processing unit 620, an audio unit 625, a video unit 630, a display 635, a keypad/touch input 640, a Near Field Communication (NFC) reader 645, and a Bluetooth interface 650.

Docking port 210 may include a port that may physically engage with tray 200 into which mobile device 105 is inserted. The shape and size of docking port 210 may be different based on a different external configuration of mobile device 105. Docking port 210 may further include a USB port 605, which also includes a charging port 610 (i.e., USB port 605 may simultaneously act as a data port and a battery charging port). Though a single USB port 605 is depicted in FIG. 6, docking station 110 may include multiple USB ports (not shown) and/or a USB hub. Charging port 605 may include an electrical connection for supplying a charging current to a battery of mobile device 105. USB port 610 may include an electrical connection for the USB that may interconnect docking station 110 with mobile device 105.

NAPT/NAT/bridging system 320 may include, in one exemplary implementation that corresponds to FIG. 4 above, a system on a chip (SOC) that implements NAPT or NAT which modifies network address information in incoming packets for the purpose of translating one IP address space into another (e.g., remaps routable public IP addresses into private, non-routable IP addresses). NAPT/NAT/bridging system 320, when implementing NAPT or NAT, may be used to firewall and control traffic sent to mobile device 105 via docking station 110, thus, enhancing the security of, and control over, traffic carried by the docked mobile device 105. NAPT/NAT/bridging system 320 may include, in another exemplary implementation that corresponds to FIG. 5 above, a SOC that implements a bridging mode which may forward packets, at layer 2, from network 115, though docking station 110, to mobile device 105. Additionally, the SOC implementing the bridging mode may forward packets, at layer 2, from mobile device 105, though docking station 110, to network 115.

Communication interface 615 may include a transceiver for communicating with network 115. Processing unit 620 may include a processor, microprocessor, or processing logic that may interpret and execute instructions. The instructions may be stored in memory (not shown), such as, for example, a random access memory (RAM), a Read Only Memory (ROM), or another type of dynamic or static storage device that may store information and instructions for execution by processing unit 620.

Audio unit 625 may include a microphone for receiving audio input into docking station 110, and may include mechanisms for playback of audio data received from the microphone, or received from mobile device 105. Video unit 630 may include a camera for capturing video, and may further include mechanisms for playback of video data received from the camera, or received from mobile device 105. Display 635 may include a display device that may display video data or other types of data associated with the operation of docking station 110 or mobile device 105. In some implementations, display 630 may include a touch screen display that registers touch input at different locations upon the touch screen. Keypad/touch input unit 640 may include an alphanumeric keypad and mechanisms for receiving indications of touch input from display 630.

NFC reader 645 may include a short range, high frequency system that enables the short range (e.g., 10 cm) exchange of data with mobile device 105. When mobile device 105 is placed in proximity to docking station 110 (e.g., device 105 is inserted into docking port 210), NFC reader 645 may "read" phone identity information from a corresponding NFC system located in device 105. In addition to phone identity information, NFC reader 645 may also read phone user identity information from the corresponding NFC system located in device 105. NFC reader 645 may, thus, be used to identify different phones that may be placed in proximity to docking station 110. Bluetooth interface 650 may include a short wavelength system for connecting with, and exchanging data over short distances, with any type of Bluetooth enabled device. Bluetooth interface 650 may, for example, connect with a Bluetooth enabled audio headset that permits a wearer to listen to audio from audio unit 625.

The configuration of components of docking station 110 illustrated in FIG. 6 is for illustrative purposes only. Other configurations may be implemented. Therefore, docking station 110 may include additional, fewer and/or different components than those depicted in FIG. 6. For example, docking station 110 may include a system(s) for implementing an Ethernet switch (not shown in FIG. 6), and/or for implementing Virtual Local Area Networks (VLANs). Docking station 110 may further include a magnetic sensor that may detect the insertion of mobile device 105 into docking port 210 and may thereby initiate various functions at docking station 110 or at mobile device 105 (e.g., initiate execution of VoIP client application 125 at mobile device 105, etc.).

Figure 7:
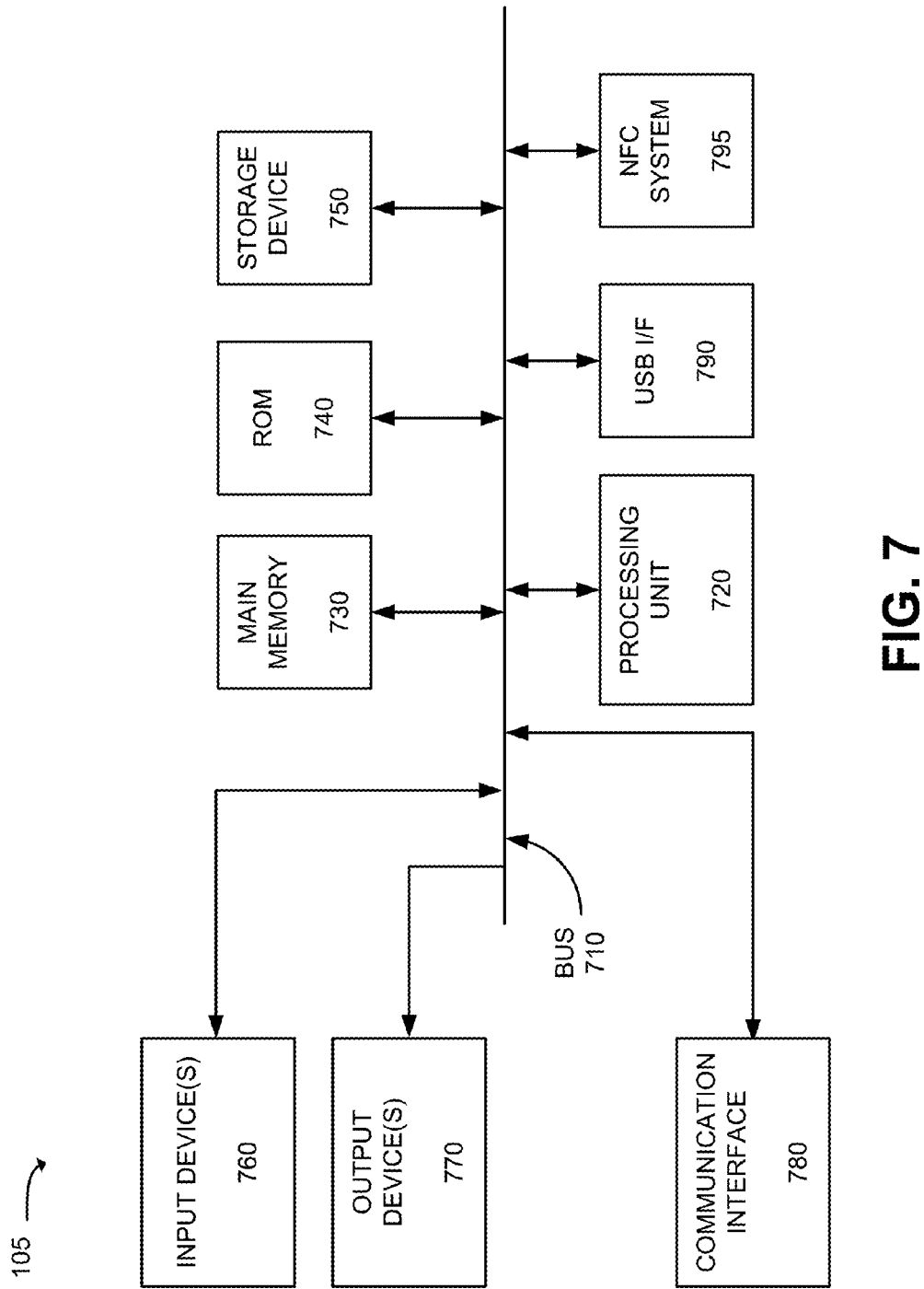
FIG. 7 is a diagram that depicts exemplary components of the mobile device of FIG. 1.

FIG. 7 is a diagram that depicts exemplary components of mobile device 105. Mobile device 105 may include a bus 710, a processing unit 720, a main memory 730, a read only memory (ROM) 740, a storage device 750, an input device(s) 760, an output device(s) 770, a communication interface 780, a USB interface 790, and a NFC system 795. Bus 710 may include a path that permits communication among the elements of mobile device 105.

Processing unit 720 may include a processor, microprocessor, or processing logic that may interpret and execute instructions. Main memory 730 may include a random access memory (RAM) or another type of dynamic storage device that may store information and instructions for execution by processing unit 720. ROM 740 may include a ROM device or another type of static storage device that may store static information and instructions for use by processing unit 720. Storage device 750 may include a magnetic and/or optical recording medium.

Input device 760 may include one or more mechanisms that permit an operator to input information to mobile device 105, such as, for example, a keypad or a keyboard, voice recognition and/or biometric mechanisms, etc. Output device 770 may include one or more mechanisms that output information to the operator, including a display, a speaker, etc. Communication interface 780 may include any transceiver mechanism that enables mobile device 105 to communicate with other devices and/or systems. For example, communication interface 780 may include a radio frequency transceiver for communicating via cellular network 120. USB I/F 790 may include interconnection mechanisms to permit mobile device 105 to physically and electrically connect with USB port 605 of docking station 110. NFC system 795 may include a short range, high frequency system that enables the short range exchange of data with mobile device 105. When mobile device 105 is placed in proximity to docking station 110 (e.g., device 105 is inserted into docking port 210), NFC system 795 may transmit phone identity information and/or phone user identity information that may be "read" by NFC reader 645 of docking station 110.

The configuration of components of mobile device 105 illustrated in FIG. 7 is for illustrative purposes only. Other configurations may be implemented. Therefore, mobile device 105 may include additional, fewer and/or different components than those depicted in FIG. 7. For example, mobile device 105 may include a GPS unit that may be used for determining a location of mobile device 105.

Figure 8A:
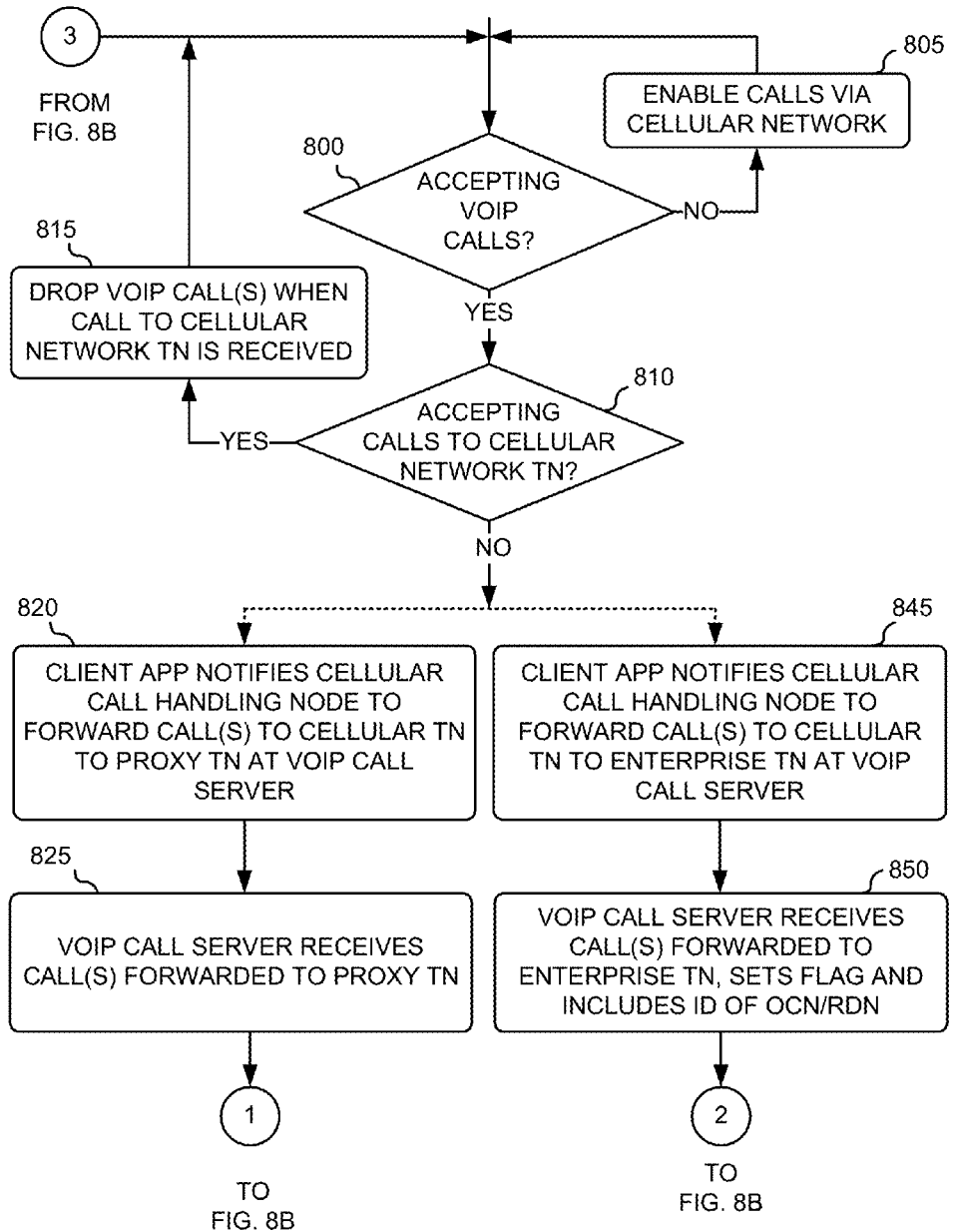
FIGS. 8A and 8B are flow diagrams that illustrate an exemplary process for selectively forwarding calls directed to a cellular network TN associated with the mobile device of FIG. 1 to an enterprise VoIP TN associated with a VoIP client application of the mobile device.
Figure 8B:
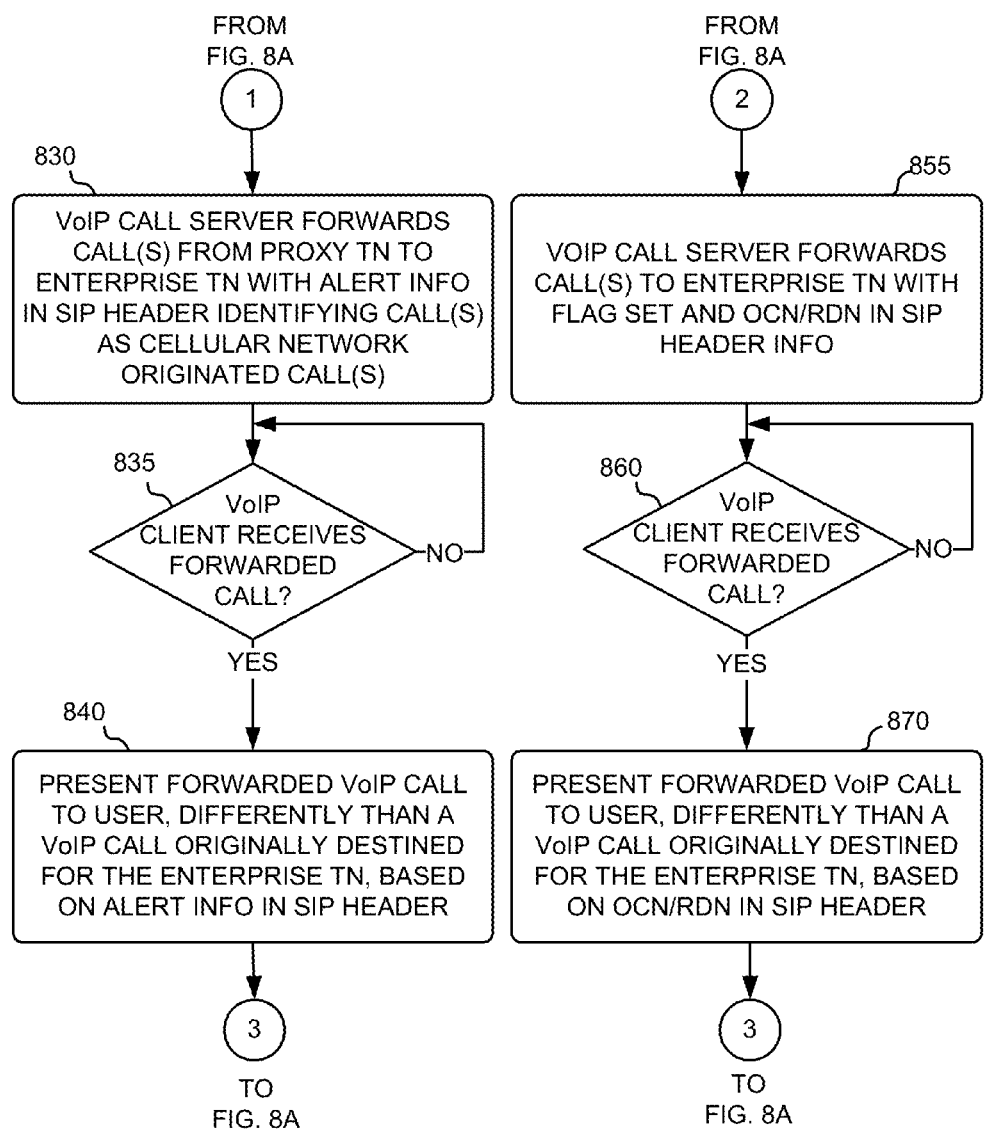

FIGS. 8A and 8B are flow diagrams that illustrate an exemplary process for selectively forwarding calls directed to a cellular network TN associated with mobile device 105 to an enterprise VoIP TN associated with VoIP client application 125 of mobile device 105. The exemplary process of FIGS. 8A and 8B may be implemented by VoIP client application 125 of mobile device 105, in conjunction with call handling node 130, and VoIP call server 135. The description of the exemplary process of FIGS. 8A and 8B below may refer to the exemplary messaging diagram of FIGS. 9 and 10.

The exemplary process may include determining whether VoIP client application 125 at mobile device 105 is accepting VoIP calls (block 800). In one exemplary implementation, VoIP client application 125 may be accepting VoIP calls from VoIP network 115 when mobile device 105 has been docked with docking station 110 (as shown in FIG. 2B). In other exemplary implementations, VoIP client application 125 may accept VoIP calls from VoIP network 115 regardless of whether mobile device 105 is docked in docking station 110. For example, mobile device may have an available connection to a wireless local area network (LAN)/wide area network (WAN), and may use that connection for sending and receiving VoIP via VoIP network 115.

If VoIP client application 125 is not accepting VoIP calls (NO—block 800), then cellular calls may be enabled via cellular network 120 (block 805). Mobile device 105 may, therefore, receive calls originating from cellular network 120. If VoIP client application 125 is accepting VoIP calls (YES—block 800), the VoIP client application 125 at mobile device 105 may determine whether mobile device 105 is accepting calls to the cellular network telephone number associated with mobile device 105 (block 810). In one exemplary implementation, when VoIP client application 125 is accepting VoIP calls, then calls via cellular network 120 may be disabled and caused to be forwarded as VoIP calls to VoIP client application 125, as described below with respect to blocks 820 through 840, or blocks 845 through 870. In another exemplary implementation, when VoIP client application 125 is accepting calls, then calls via cellular network 120 may also be accepted, and when a call via cellular network 120 is received, any active VoIP calls being received via VoIP network 115 may be dropped. If mobile device 105 is accepting calls to the cellular network telephone number (YES—block 810), then VoIP client application 125 may drop active VoIP call(s) when a call to the cellular network telephone number is received at mobile device 105 (block 815).

If mobile device 105 is not accepting calls to the cellular network telephone number (NO—block 810), then two different techniques may be used to enable VoIP client application 125 to cause calls directed to a cellular network TN associated with mobile device 105 to be selectively forwarded to mobile device 105 as a VoIP call via VoIP network 115. In a first exemplary technique, shown in blocks 820 through 840 of FIGS. 8A and 8B, calls directed to a cellular network TN are forwarded to a proxy TN at VoIP call server 135. VoIP call server 135 then forwards the calls as VoIP calls to mobile device 105 along with alert information in the SIP header that identifies the calls as having originated in cellular network 120. In a second exemplary technique, shown in blocks 845 through 870 of FIGS. 8A and 8B, calls directed to a cellular network TN are forwarded to an enterprise VoIP TN at VoIP call server 135. VoIP call server 135 then forwards the calls as VoIP calls to mobile device 105 along with an OCN and/or RDN, which identifies the cellular network TN that was originally called, included in the SIP header information.

Figure 9:
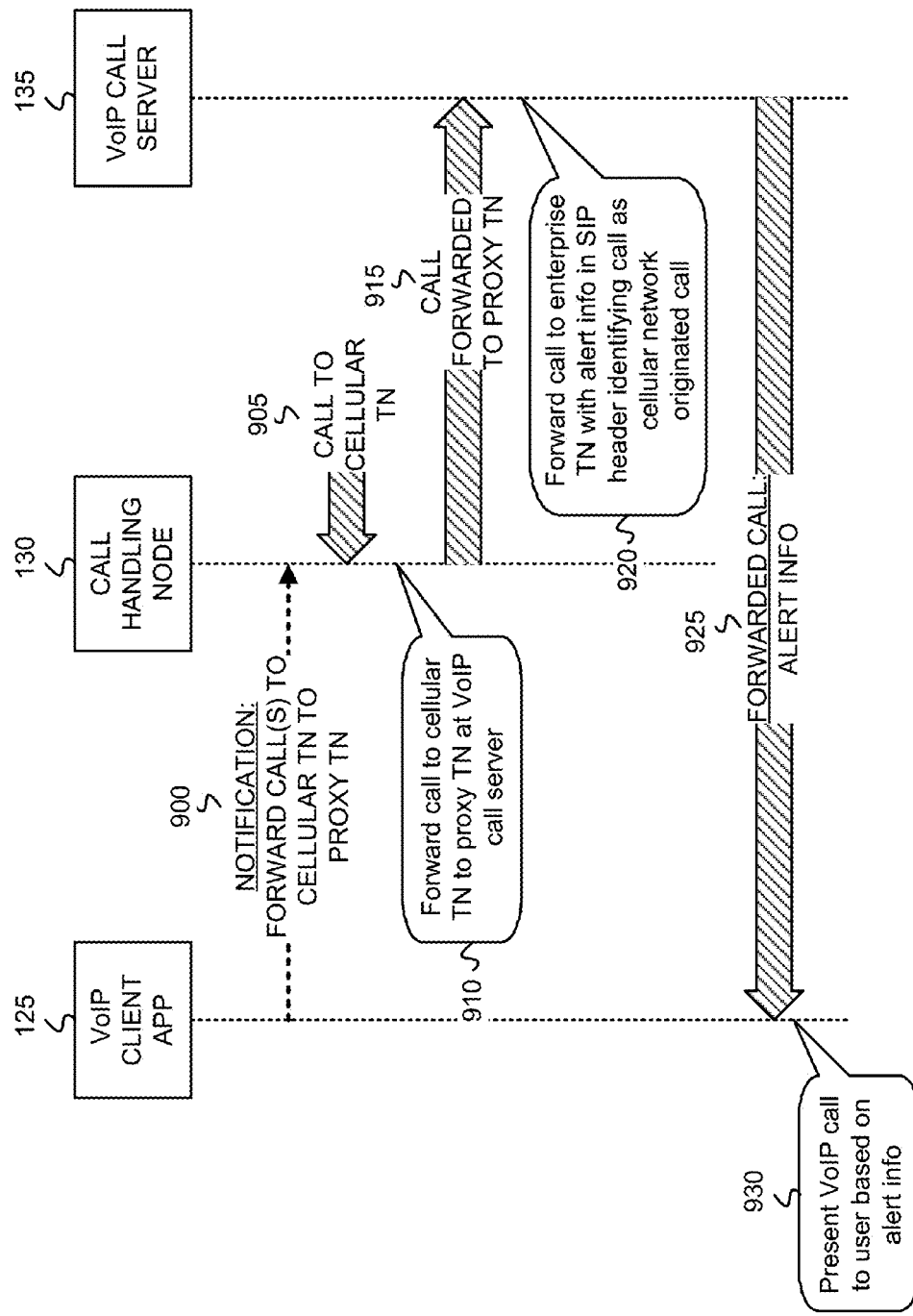
FIGS. 9 and 10 are diagrams that illustrate exemplary messaging associated with the exemplary process of FIGS. 8A and 8B.

In the first exemplary technique, VoIP client application 125 notifies cellular network call handling node 130 to forward calls directed to mobile device 105's cellular network TN to a proxy TN at VoIP call server 135 (block 820). FIG. 9 depicts VoIP client application 125 sending a notification message 900 to call handling node 130 to instruct call handling node 130 to forward calls directed to the cellular network telephone number associated with mobile device 105 to a proxy telephone number in VoIP network 115. Subsequent to receiving notification message 900, call handling node 130 may receive, as shown in FIG. 9, a call 905 directed to mobile device 105's cellular network telephone number. Based on the instructions in notification message 900, call handling node 130 may forward 910 the call originally destined for the cellular network telephone number 915 to the proxy telephone number at VoIP call server 115. FIG. 9 depicts the call 915 being forwarded to the proxy TN at VoIP call server 135.

VoIP call server 135 receives a call forwarded to the proxy TN (block 825) and then forwards the call from the proxy TN to an enterprise VoIP TN with alert information in the SIP header that identifies the call as originating in cellular network 120 (block 830, FIG. 8B). VoIP call server 135 may retrieve (e.g., from a table look-up), a unique enterprise VoIP telephone number that corresponds to the proxy telephone number, where the unique enterprise VoIP telephone number is the VoIP TN associated with VoIP client application 125 at mobile device 105. VoIP call server 135 may set alert information in the SIP header of SIP signaling associated with the forwarded call to identify the call as a cellular network originated call (i.e., that the call was originally destined for the cellular network TN associated with mobile device 105). As shown in FIG. 9, VoIP call server 135 forwards 920 the call to the enterprise TN with the alert information in the SIP header identifying the call as a cellular network originated call.

VoIP client application 125 may determine whether the forwarded call from VoIP call server 135 has been received at mobile device 105 (block 835). FIG. 9 depicts VoIP client application 125 receiving the call 925 forwarded from VoIP call server 135, with corresponding alert information being included in SIP signaling information associated with call 925. If the forwarded call from VoIP call server 135 has been received at mobile device 105 (YES—block 835), then VoIP client application 125 may present the forwarded VoIP call to a user of mobile device 105, differently than a VoIP call originally destined for the user's enterprise VoIP TN, based on the alert information in the SIP header associated with the forwarded VoIP call (block 840). FIG. 9 depicts VoIP client application 125 presenting 930 the forwarded VoIP call to a user of mobile device 105 based on the alert information in the SIP signaling. In one exemplary implementation, presenting the forwarded call differently to the user may include using distinctive ringing for the call forwarded from the VoIP call server that is different than ringing used for the VoIP calls received at the mobile device that were originally destined for the VoIP telephone number. In another exemplary implementation, presenting the forwarded call differently to the user may include displaying, at the mobile device, an indication that the forwarded call was originally destined for the cellular telephone number. The exemplary process may then return to block 800.

Figure 10:
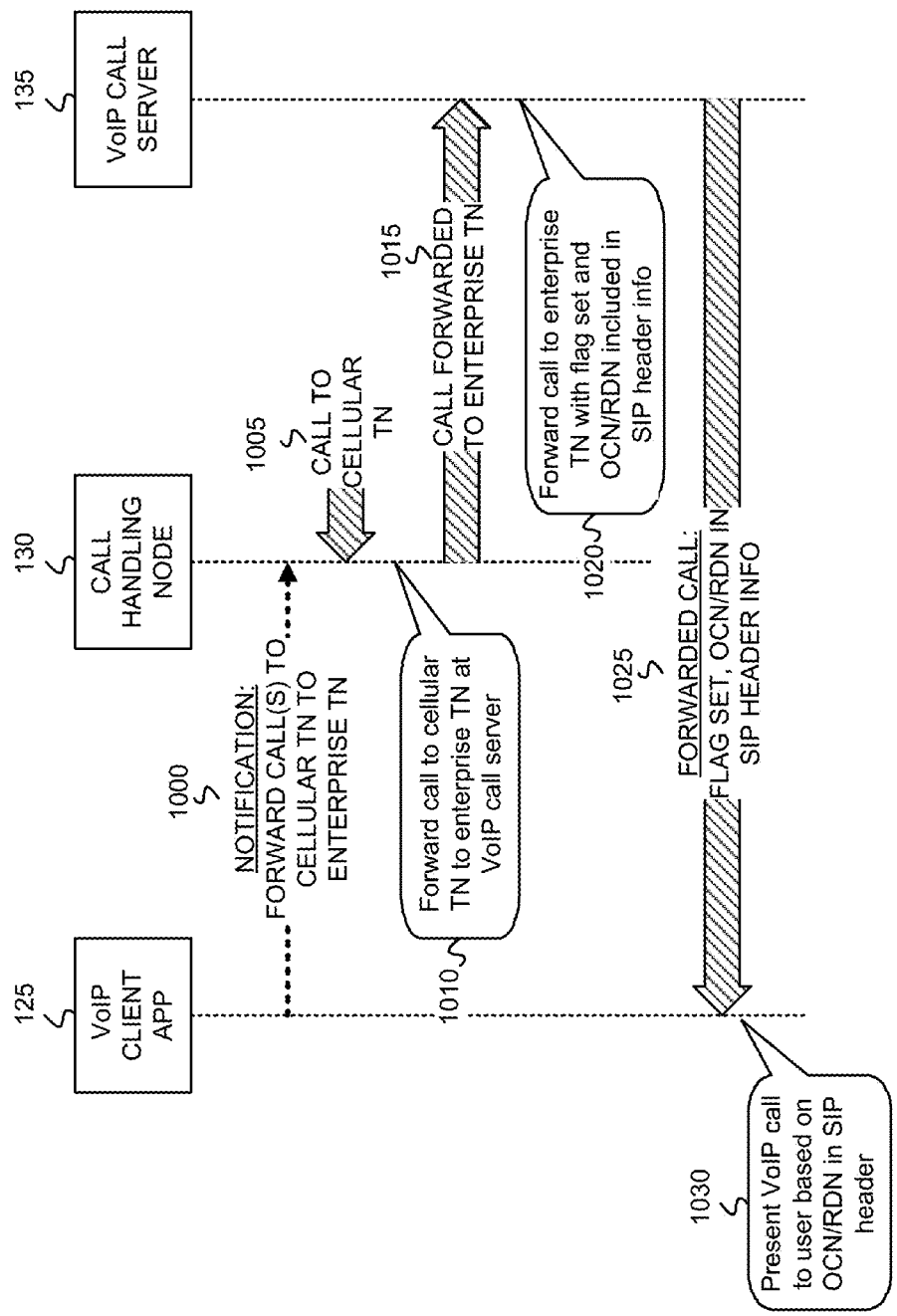

In the second exemplary technique, shown in blocks 845 through 870 of FIGS. 8A and 8B, VoIP client application 125 notifies cellular network call handling node 130 to forward calls directed to mobile device 105's cellular network TN to an enterprise VoIP TN at VoIP call server 135 (block 845). As depicted in FIG. 10, VoIP client application 125 sends a notification message 1000 to call handling node 130 to instruct call handling node 130 to forward calls destined for the cellular telephone number associated with mobile device 105 to an enterprise VoIP telephone number associated with VoIP client application 125 of mobile device 105. Subsequent to receiving notification message 1000, call handling node 130 may receive, as shown in FIG. 10, a call 1005 directed to mobile device 105's cellular network telephone number. Based on the instructions in notification message 1000, call handling node 130 may forward 1010 the call 1015 originally destined for the cellular network telephone number to the enterprise VoIP telephone number at VoIP call server 135. FIG. 10 depicts the call 1015 being forwarded to the enterprise VoIP telephone number at VoIP call server 135.

VoIP call server 135 may receive the call forwarded to the enterprise VoIP TN, may set a flag (i.e., set value of flag from zero to one) indicating that the call was originally directed to mobile device 105's cellular network TN, and may include an identification of the originally called number (OCN) or the Redirect number (RDN) (block 850). VoIP call server 135 may forward the received call to the enterprise VoIP TN with the flag set and an OCN and/or RDN included in SIP header information associated with the forwarded call (block 855, FIG. 8B). As shown in FIG. 10, VoIP call server 135 forwards 1020 the call, as a VoIP call 1025, to the enterprise VoIP telephone number with the flag set, and an OCN and/or RDN included in SIP signaling associated with the call.

VoIP client application 125 may determine whether the forwarded call from VoIP call server 135 has been received at mobile device 105 (block 860). FIG. 10 depicts the forwarded call 1025 from VoIP call server 135 being received at VoIP client application 125, with the set flag, and an OCN and/or RDN included in SIP signaling associated with the call. If the forwarded call is received at VoIP client application 125 (YES—block 860), then VoIP client application 125 may present the forwarded VoIP call to a user of mobile device 105, differently than a VoIP call originally destined for the user's enterprise VoIP TN, based on the OCN and/or RDN included in the SIP header information associated with the forwarded VoIP call (block 870).

FIG. 10 depicts VoIP client application 125 presenting 1030 the forwarded VoIP call to a user of mobile device 105 based on the set flag and/or the OCN/RDN in the SIP signaling that identifies the call as having originated in cellular network 120 and identifies the telephone number in cellular network 120 to which the call was originally destined. In one exemplary implementation, presenting the forwarded call differently to the user may include using distinctive ringing for the call forwarded from the VoIP call server that is different than ringing used for the VoIP calls received at the mobile device that were originally destined for the VoIP telephone number. In another exemplary implementation, presenting the forwarded call differently to the user may include displaying, at the mobile device, an indication that the forwarded call was originally destined for the cellular telephone number. The exemplary process may then return to block 800.

The foregoing description of implementations provides illustration and description, but is not intended to be exhaustive or to limit the invention to the precise form disclosed. Modifications and variations are possible in light of the above teachings or may be acquired from practice of the invention.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A mobile device, comprising:
    a memory configured to store a Voice over Internet Protocol (VoIP) client application;
    a docking station interface configured to interface with a docking port of a docking station, wherein the docking station connects to a VoIP network; and
    a processing unit configured to execute the VoIP client application to:
        determine whether the mobile device is docked with the docking station, wherein the mobile device is capable of receiving calls to a cellular telephone number and calls to a VoIP telephone number,
        notify, via the docking station interface if the mobile device is determined to be docked with the docking station, a call handling node in a cellular network to forward incoming calls destined for the mobile device's cellular telephone number to a proxy telephone number at a VoIP call server in the VoIP network, wherein the proxy telephone number is different than the cellular telephone number and the VoIP telephone number,
        receive, via the docking station interface, a call forwarded from the VoIP call server to the VoIP telephone number via the VoIP network, wherein the VoIP call server uses the proxy telephone number to identify the VoIP telephone number based on a table look-up and wherein the call was originally destined for the cellular telephone number.

2. The mobile device of claim 1, wherein the docking station interface comprises a Universal Serial Bus (USB) interface and wherein, when the mobile device is docked with the docking station, the USB interface connects with a USB port in the docking port of the docking station.

3. The mobile device of claim 2, wherein the docking station connects to the VoIP network via a wired connection and, when the mobile device is docked with the docking station, the mobile device connects to the VoIP network via the USB interface, the USB port, and the wired connection from the docking station to the VoIP network.

4. The mobile device of claim 1, wherein the mobile device comprises a cellular telephone, a tablet computer, or a personal digital assistant (PDA).

5. The mobile device of claim 1, wherein the processing unit is further configured to execute the VoIP client application to:
    cause the call forwarded from the VoIP call server to be displayed to a user of the mobile device differently than VoIP calls received at the mobile device that were originally destined for the VoIP telephone number.

6. The mobile device of claim 1, wherein the processing unit is further configured to receive information associated with the call forwarded from the VoIP call server that identifies that the call was originally destined for the cellular telephone number.

7. The mobile device of claim 6, wherein the information associated with the call forwarded from the VoIP call server comprises alert information in a Session Initiation Protocol (SIP) header associated with the call that identifies the call as having originated in a cellular network.

8. The mobile device of claim 1, wherein the processing unit is further configured to use distinctive ringing for the call forwarded from the VoIP call server that is different than ringing used for VoIP calls originally destined for the VoIP telephone number.

9. The mobile device of claim 1, wherein the docking station comprises a VoIP phone that has a wired connection to the VoIP network and has a docking port that permits the mobile device to be inserted into, and docked with, the docking station.

10. A system, comprising:
    a call handling node in a cellular network configured to:
        receive a notification from a mobile device, responsive to the mobile device docking with a docking station, wherein the mobile device is capable of receiving calls to a cellular telephone number and calls to a Voice over Internet Protocol (VoIP) telephone number, wherein the notification instructs the call handling node to forward incoming calls destined for the mobile device's cellular telephone number to a proxy telephone number, and wherein the proxy telephone number is different than the cellular telephone number and the VoIP telephone number,
        receive a call destined for the cellular telephone number of the mobile device, and
        forward the call from the call handling node to the proxy telephone number via the cellular network; and
    a VoIP call server in a VoIP network configured to:
        receive the call forwarded from the call handling node to the proxy telephone number,
        perform a table look-up to identify, using the proxy telephone number, the VoIP telephone number, and
        forward the call to the mobile device at the VoIP telephone number via the VoIP network.

11. The system of claim 10, wherein the VoIP call server, when forwarding the call, is further configured to:
    include information in SIP signaling associated with the call that identifies the call as a cellular network originated call.

12. The system of claim 11, wherein the signaling comprises SIP signaling and wherein the information is included in a SIP header of the SIP signaling.

13. The system of claim 10, wherein the docking station comprises a VoIP phone that has a wired connection to the VoIP network and has a docking port that permits the mobile device to be inserted into, and docked with, the docking station.

14. The system of claim 10, wherein the mobile device comprises a cellular telephone, a tablet computer, or a personal digital assistant (PDA).

15. A system, comprising:
a call handling node in a cellular network configured to:
receive a notification from a mobile device, responsive to the mobile device docking with a docking station, wherein the mobile device is capable of receiving calls to a cellular telephone number and calls to a Voice over Internet Protocol (VoIP) telephone number, wherein the notification instructs the call handling node to forward incoming calls destined for the mobile device's cellular telephone number to the VoIP telephone number,
receive a call destined for the cellular telephone number of the mobile device, and
forward the call from the call handling node to the VoIP telephone number via the cellular network; and
a VoIP call server in a VoIP network configured to:
receive the call forwarded from the call handling node to the VoIP telephone number,
set a flag in signaling associated with the call that indicates that the call was originally destined for the cellular telephone number of the mobile device,
include the cellular telephone number in the signaling associated with the call, and
forward the call to the mobile device at the VoIP telephone number via the VoIP network.

16. The system of claim 15, wherein the signaling comprises Session Initiation Protocol (SIP) signaling and wherein the flag is set, and the cellular telephone number is included, in a SIP header of the SIP signaling.

17. The system of claim 15, wherein the mobile device comprises a cellular telephone, a tablet computer, or a personal digital assistant (PDA).

18. The system of claim 15, wherein the docking station comprises a VoIP phone that has a wired connection to the VoIP network and has a docking port that permits the mobile device to be inserted into, and docked with, the docking station.

* * * * *